United States Patent
Spesser

(10) Patent No.: US 10,099,565 B2
(45) Date of Patent: Oct. 16, 2018

(54) CHARGING APPARATUS FOR A MOTOR VEHICLE

(71) Applicant: Dr. Ing. h.c. F. Porsche Aktiengesellschaft, Stuttgart (DE)

(72) Inventor: Daniel Spesser, Illingen (DE)

(73) Assignee: Dr. Ing. H.c.F. Porsche Aktiengesellschaft, Stuttgart (DE)

( * ) Notice: Subject to any disclaimer, the term of this patent is extended or adjusted under 35 U.S.C. 154(b) by 132 days.

(21) Appl. No.: 15/214,945

(22) Filed: Jul. 20, 2016

(65) Prior Publication Data
US 2017/0028861 A1 Feb. 2, 2017

(30) Foreign Application Priority Data

Jul. 29, 2015 (DE) .......................... 10 2015 112 349

(51) Int. Cl.
*H02J 7/00* (2006.01)
*B60L 11/18* (2006.01)

(52) U.S. Cl.
CPC ......... *B60L 11/1818* (2013.01); *H02J 7/0026* (2013.01); *H02J 7/0029* (2013.01); *B60L 2240/36* (2013.01); *Y02T 10/7005* (2013.01); *Y02T 10/7072* (2013.01); *Y02T 90/14* (2013.01)

(58) Field of Classification Search
CPC ...... H02J 7/0021; H02J 7/0026; H02J 7/0029; B60L 11/1818
USPC ............................................ 320/109; 701/22
See application file for complete search history.

(56) References Cited

U.S. PATENT DOCUMENTS

| | | | |
|---|---|---|---|
| 2009/0079389 A1* | 3/2009 | Ohtomo | B60K 6/28 320/109 |
| 2009/0316321 A1* | 12/2009 | Ouwerkerk | H02H 5/046 361/106 |
| 2012/0212179 A1 | 8/2012 | Nathan et al. | |

(Continued)

FOREIGN PATENT DOCUMENTS

| | | |
|---|---|---|
| CN | 103138316 | 6/2013 |
| DE | 10 2011 010 227 | 8/2012 |
| DE | 10 2012 200 523 | 8/2012 |

(Continued)

OTHER PUBLICATIONS

German Search Report dated Aug. 14, 2015.

*Primary Examiner* — Drew A Dunn
*Assistant Examiner* — Zixuan Zhou
(74) *Attorney, Agent, or Firm* — Gerald E. Hespos; Michael J. Porco; Matthew T. Hesos

(57) ABSTRACT

A charging apparatus (22) for a motor vehicle (10) has a plurality of plug connection members (12, 14, 16) to connect the charging apparatus (22) to at least one external electrical energy source (18, 20), a plurality of temperature measuring elements (26, 28, 30) are associated respectively with the plug connection members (12, 14, 16) to detect a temperature of the plug connection members (12, 14, 16), and an evaluation unit (32) electrically connected to the temperature measuring elements (26, 28, 30) to evaluate the detected temperature of the temperature measuring elements (26, 28, 30). The temperature measuring elements (26, 28, 30) are connected to the evaluation unit (32) by a common first connecting line (42), and connectable electrically to the control unit (32) individually by a second connecting line (36, 38, 40) in each case.

8 Claims, 4 Drawing Sheets

(56) References Cited

U.S. PATENT DOCUMENTS

2013/0134933 A1   5/2013   Drew et al.
2015/0171568 A1   6/2015   Kawamoto et al.

FOREIGN PATENT DOCUMENTS

JP   2013118798 A   6/2013
JP   2014218002 A   11/2014

* cited by examiner

CHARGING APPARATUS FOR A MOTOR VEHICLE

CROSS REFERENCE TO RELATED APPLICATION

This application claims priority under 35 USC 119 to German Patent Appl. No. 10 2015 112 349.5 filed on Jul. 29, 2015, the entire disclosure of which is incorporated herein by reference.

BACKGROUND

1. Field of the Invention

The invention relates to a charging apparatus for a motor vehicle, comprising a plurality of plug connection members to connect the charging apparatus to at least one external electrical energy source, a plurality of temperature measuring elements that are associated respectively with the plug connection members to detect a temperature of the plug connection members, and an evaluation unit that is connected electrically to the temperature measuring elements to evaluate the detected temperature of the temperature measuring elements.

The invention further relates to a motor vehicle comprising an electrical machine for providing drive power, an electrical energy store for storing electrical energy for the electrical drive machine, and a charging apparatus for charging the electrical energy store.

Finally, the invention relates to a method for detecting a temperature of a plurality of plug connection members of a charging apparatus of a motor vehicle.

2. Related Art

Electrically driven motor vehicles usually have charging sockets to connect the motor vehicle to external charging stations and to charge an internal electrical energy store. During a charging process, large quantities of electrical energy usually are transmitted via the charging sockets, and therefore the charging sockets can heat up during a charging process. To protect the charging sockets against excessive temperatures and temperature-related damage, the charging sockets usually have temperature sensors that detect the temperature of the charging sockets and accordingly transmit the temperature to a central control unit for controlling the charging process. The control unit may, if necessary, abort the charging process if the temperature of the charging sockets exceeds a threshold value. A charging apparatus with temperature-monitored charging sockets is known from CN 103138316 A for example.

One disadvantage of this is that each individual temperature sensor is separately electrically connected to an operational amplifier by means of two electrical lines, and therefore the outlay on cabling for the temperature sensors in the motor vehicle is high.

An object of the invention is to provide a charging apparatus for a motor vehicle, and in particular a charging apparatus with temperature measuring elements that can be connected electrically to an evaluation unit with a low level of technical outlay.

SUMMARY

The invention relates to a charging apparatus with temperature measuring elements connected to an evaluation unit by a common first connecting line. Additionally, the temperature measuring elements are connected electrically or can be connected electrically to the control unit individually by a second connecting line in each case. The charging apparatus may be used for charging the electrical energy store of motor vehicle. The method of the invention may include are individually sequentially electrically connecting the temperature measuring elements to the evaluation unit for separately detecting the respective temperature of the plug connectors.

The outlay on cabling is reduced considerably by connecting the temperature measuring elements to the evaluation unit by a common first connecting line because the temperature measuring elements have only an individual electrical line for making electrical contact. Furthermore, the second electrical contact connects the temperature measuring elements to the evaluation unit by the common electrical connection line.

The individually electrically connection of the temperature measuring elements sequentially to the evaluation unit in accordance with the method of the invention enables an individual evaluation unit to evaluate the measurement signals from plural temperature measuring elements, thereby further reducing the technical outlay.

Each of the two connecting lines can be connected to the evaluation unit by a controllable switch. As a result, the temperature measuring elements can be connected individually to the evaluation unit, and therefore an individual evaluation unit in the form of, for example, an operational amplifier can be used for all temperature measuring elements, and therefore the technical outlay is reduced further.

The controllable switches may be connected to a control unit to open and close the controllable switches and accordingly to connect the temperature measuring elements selectively to the evaluation unit. As a result, an offset current on the common first connecting line can be avoided, and therefore precise measurement of the temperature is possible.

The control unit may be designed to connect a temperature measuring element to the evaluation unit. The temperature measuring element may be associated with a plug connection member that is connected to an external energy source. As a result, the temperature of the respectively used plug connection member can be detected, and an excess temperature by the plug connection member during charging can be avoided.

The temperature measuring elements can be connected to an electrical connection of the evaluation unit by one of the controllable switches in each case. As a result, an individual evaluation unit can be used for evaluating the temperature of various temperature measuring elements, and therefore the technical outlay is reduced further.

The evaluation unit may be designed to calculate an electrical charging power that is transmittedvia the plug connection member based on the detected temperature of the plug connection member used. As a result, the electrical charging power can be limited and damage to the electrical components can be avoided.

The temperature measuring elements may be in the form of temperature measuring resistors. As a result, the temperature of the plug connection members can be detected precisely with a low level of technical outlay.

The evaluation unit may be an operational amplifier. As a result, the detected temperature signal from the temperature measuring elements can be evaluated precisely.

The plug connection members may be charging sockets of the motor vehicle. Thus, reliable and simple connection of the charging apparatus to an external electrical energy source, such as a charging station for example.

Overall, the charging apparatus enables the outlay on cabling for the temperature measuring elements to be reduced considerably due to the common first connecting line and the individual second connecting line because the temperature measuring elements each have only one individual feed line and are connected or can be connected to the evaluation unit by a common return line.

The features mentioned above and those still to be described below can be used in the respectively specified combination and also in other combinations or on their own without departing from the scope of the invention.

Exemplary embodiments of the invention are illustrated in the drawings and will be explained in greater detail in the following description.

DETAILED DESCRIPTION

Figure 1:
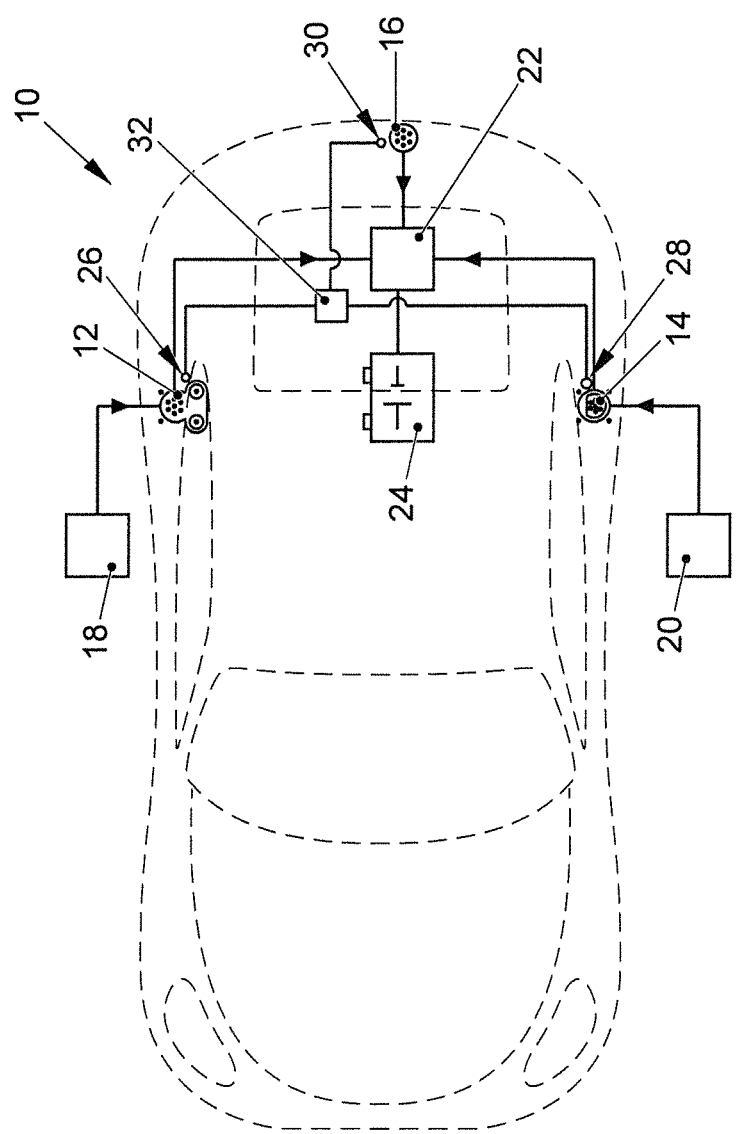
FIG. 1 is a schematic illustration of a motor vehicle comprising a charging apparatus for charging an electrical energy store.

FIG. 1 shows a schematic plan view of a motor vehicle which is designated 10 in general. The motor vehicle 10 can be in the form of a purely electrically driven vehicle or a motor vehicle with a hybrid drive and has three electrical charging sockets 12, 14, 16 to connect connect the motor vehicle 10 electrically to one or a plurality of electrical energy sources 18, 20 and accordingly to supply electrical energy to electrical loads and/or electrical energy stores.

The charging sockets 12, 14, 16 are connected electrically to a charging unit 22. The charging unit 22 is connected electrically to an electrical energy store 24 of the motor vehicle 10 to charge the electrical energy store 24.

The charging unit 22 functions to forward a high electrical voltage from the external electrical energy sources 18, 20 to the electrical energy store 24 and, if necessary, to convert the voltage into a charging voltage.

A respective temperature sensor 26, 28, 30 is associated with the charging sockets 12, 14, 16 to detect the temperature of the respective charging socket 12, 14, 16 to avoid excess temperatures during the transmission of electrical energy by means of the charging sockets 12, 14, 16. The temperature sensors 26, 28, 30 generally are connected electrically to a control unit 32 to evaluate the temperature signals from the temperature sensors 26, 28, 30 and accordingly to control the charging process.

The temperature sensors 26, 28, 30 are connected generally to the control unit 32 by an individual electrical line in each case. Thus, all of the temperature sensors 26, 28, 30 are connected to the control unit 32 by a common return line, as is explained in greater detail below. Therefore, the technical outlay for electrically connecting the temperature sensors 26, 28, 30 to the control unit 32 can be reduced.

Figure 2:
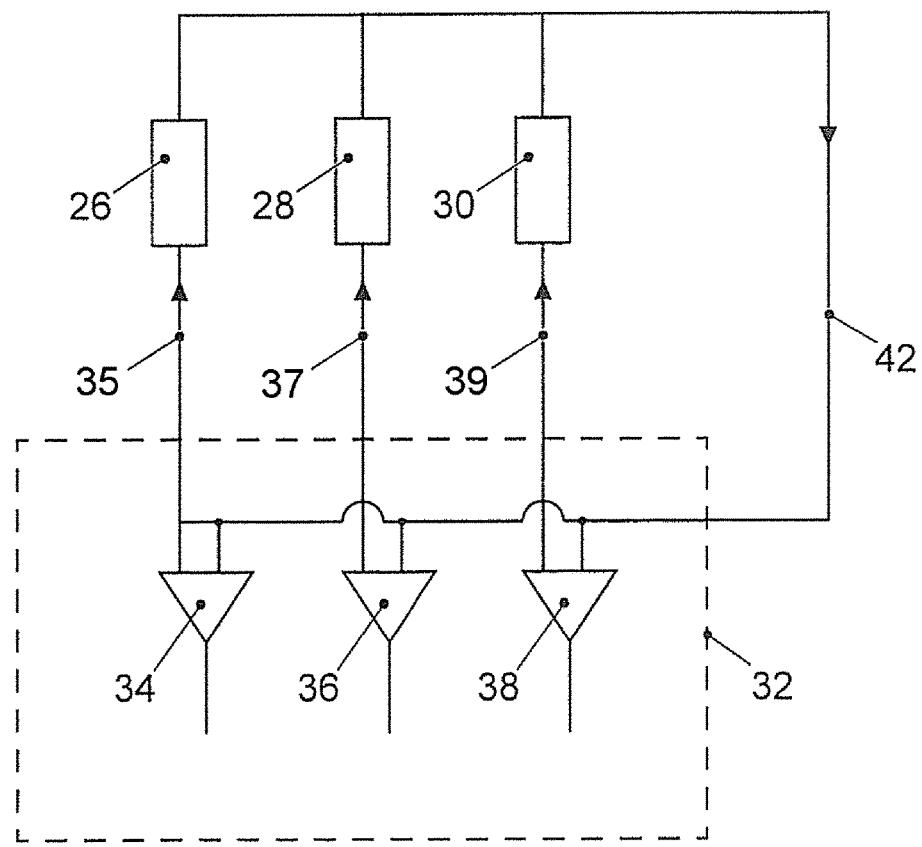
FIG. 2 is a schematic illustration of a circuit for electrically connecting various temperature measuring elements to an evaluation unit.

FIG. 2 shows a first embodiment of an electrical circuit of the control unit 32 and also of the temperature sensors 26, 28, 30 that are connected to the control unit 32.

The temperature sensors 26, 28, 30 are temperature measuring resistors in this embodiment. The control unit 32 has three operational amplifiers 34, 36, 38. A first electrical connection of the operational amplifiers 34, 36, 38 to the temperature sensors 26, 28, 30 is by individual electrical lines The temperature sensors 26, 28, 30 are connected to a second electrical connection of the operational amplifiers 34, 36, 38 by a common electrical line 42. This electrical contact-connection of the temperature sensors 26, 28, 30 reduces the technical outlay on cabling for the temperature sensors 26, 28, 30 since the common electrical line 42 is used as a return line for connecting the temperature sensors 26, 28, 30 to the operational amplifiers 34, 36, 38.

Figure 3:
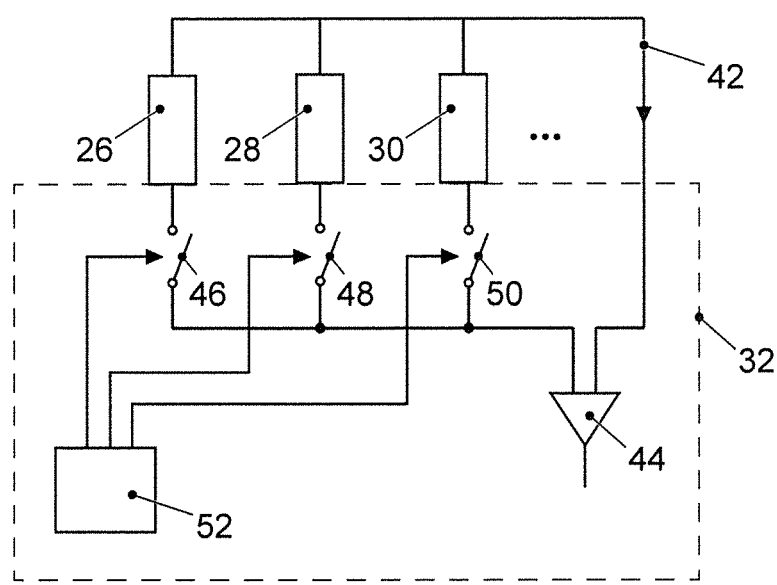
FIG. 3 shows a further embodiment of the circuit for connecting the temperature measuring elements to an evaluation unit.

FIG. 3 shows a further embodiment of a circuit of the control unit 32 and also of the temperature sensors 26, 28, 30 that are connected to the control unit.

In this embodiment, the control unit 32 has only one operational amplifier 44, and it is possible to connect the first input connection of the operational amplifier to the temperature sensors 26, 28, 30 by the individual electrical lines 36, 38, 40. The electrical lines 36, 38, 40 each have a controllable switch 46, 48, 50 for individually connecting the temperature sensors 26, 28, 30 electrically to the first input connection of the operational amplifier 44. The temperature sensors 26, 28, 30 are connected to a second input connection of the operational amplifier 44 by the common electrical line 42. The control unit 32 further has a controller 52 that is connected to the controllable switches 46, 48, 50 to open and close the controllable switches 46, 48, 50 sequentially and to connect the temperature sensors 26, 28, 30 electrically to the operational amplifier 44 individually and in succession. The controller 52 preferably is a microcontroller.

The individual connection of the temperature sensors 26, 28, 30 by the controllable switches 46, 48, 50 enables the temperature measurement values from the temperature sensors 26, 28, 30 to be read out and evaluated with a time delay by an individual operational amplifier 44, and therefore the technical outlay on the control unit 32 is reduced.

Furthermore, the controllable switches 46, 48, 50 can be used to prevent an offset current on the common electrical line 42. As a result, the measurement signal from the temperature sensors 26, 28, 30 can be detected precisely and is not influenced by the offset current.

Owing to a sequential delayed electrical connection of in each case one temperature sensor 26, 28, 30 to the operational amplifier 44, all of the temperature measurement signals can be read out in succession, and therefore the temperature of the charging sockets 12, 14, 16 can be detected in succession and at regular intervals and reliable temperature measurement of the charging sockets 12, 14, 16 is possible. If only one of the charging sockets 12, 14, 16 is connected electrically to an external electrical energy source 18, 20 for charging the electrical energy store 24, in each case only the correspondingly associated temperature sensor 26, 28, 30 can be connected to the operational amplifier 44, and therefore only the used charging socket is monitored in this case.

Figure 4:
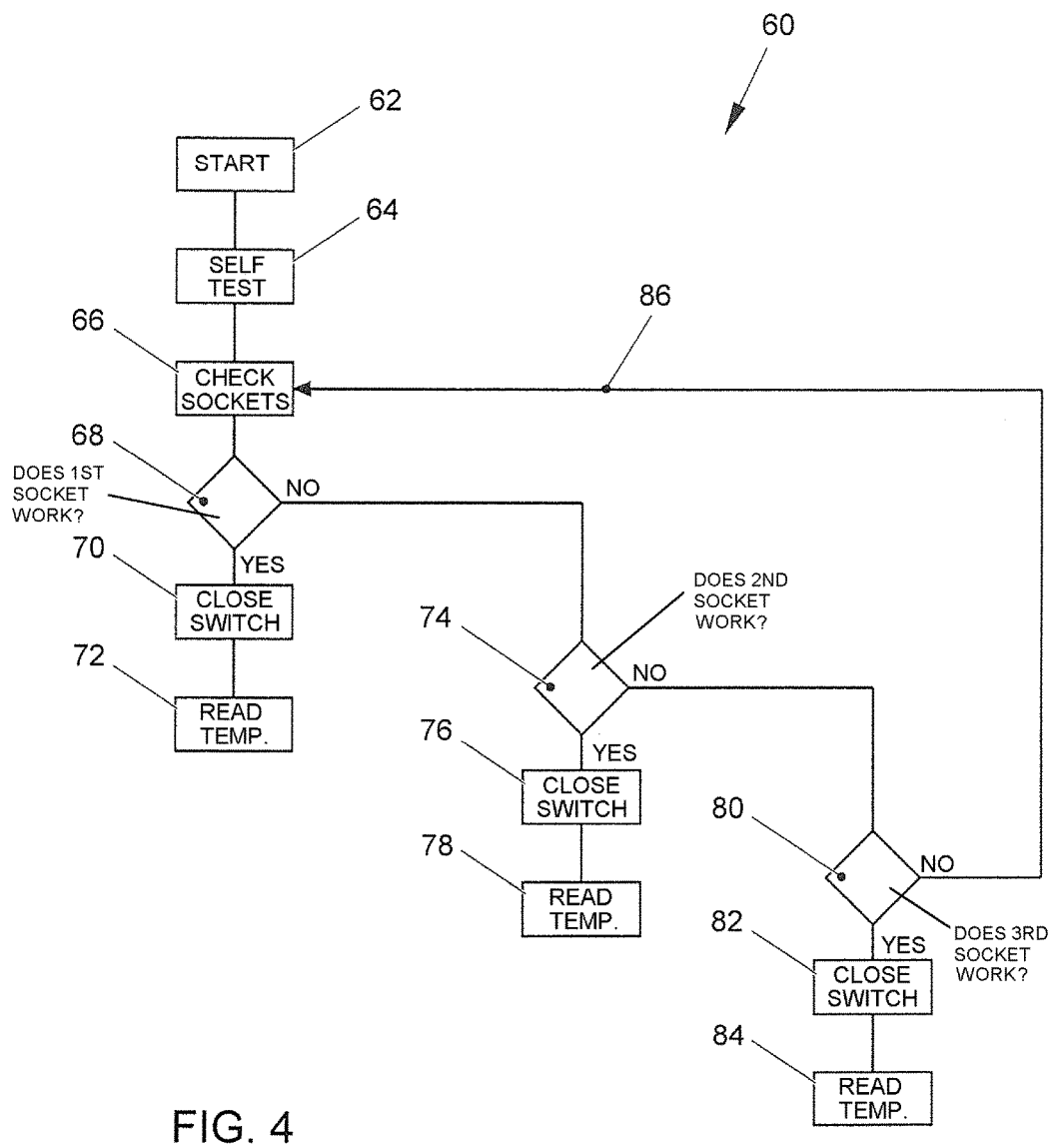
FIG. 4 shows a flowchart of a method for determining a temperature of a used charging socket of a motor vehicle.

FIG. 4 schematically shows a schematic flow chart for explaining the process of reading out a measurement value from the temperature sensors 26, 28, 30. The method is designated 60 in general. The method begins with step 62. In step 64, a self-test by the controllable switches 46, 48, 50 is first carried out. In step 66, the control unit 32 checks which of the charging sockets 12, 14, 16 for charging the electrical energy store 24 is connected. In step 68, a check is made to determine whether a first charging socket 12 is in operation and, if the first charging socket 12 is in operation, the controllable switch 46 is driven in step 70, and the measurement value from the temperature sensor 26 is read out in step 72.

If the first charging socket 12 is not in operation, a check is made in step 74 to determine whether the second charging socket 14 is in operation and, if the second charging socket 14 is in operation, the controllable switch 48 is driven, that is closed, in step 76, and the measurement value from the temperature sensor 28 is read out in step 78.

If it is determined in step 74 that the second charging socket 14 is not in operation, a check is made in step 80 to determine whether the third charging socket 16 is in operation and, if the third charging socket 16 is in operation, the controllable switch 50 is closed in step 82, and the temperature measurement value from the temperature sensor 30 is read out in step 84. If none of the charging sockets 12, 14, 16 is connected, the method 60 returns to step 66, as is shown by the feedback 86. This check can be made at regular intervals, for example once every second.

The controllable switches 46, 48, 50 can be closed in a targeted manner by the method to read a specific one of the temperature sensors 26, 28, 30 and to measure the temperature of the charging socket 12, 14, 16 that is accordingly in operation.

What is claimed is:

1. A charging apparatus for a motor vehicle, comprising:
   a plurality of plug connection members to connect the charging apparatus to at least one external electrical energy source,
   a plurality of temperature measuring elements associated respectively with the plug connection members to detect a temperature of the plug connection members, and
   an evaluation unit connected electrically to the temperature measuring elements to evaluate the detected temperature of the temperature measuring elements, wherein
   the temperature measuring elements are connected to the evaluation unit by a common first connecting line, and are connectable electrically to a control unit individually by a second connecting line that are connected respectively to the evaluation unit by controllable switches that are connected to a control unit to open and to close the controllable switches for selectively connecting the temperature measuring elements to the evaluation unit.

2. The charging apparatus of claim 1, wherein the control unit is designed to connect a temperature measuring element to the evaluation unit, the temperature measuring element being associated with a plug connection member that is connected to an external energy source.

3. The charging apparatus of claim 1, wherein the temperature measuring elements are connected to an electrical connection of the evaluation unit by one of the controllable switches in each case.

4. The charging apparatus of claim 1, wherein the temperature measuring elements are temperature measuring resistors.

5. The charging apparatus of claim 1, wherein the evaluation unit is an operational amplifier.

6. The charging apparatus of claim 1, wherein the plug connection members are charging sockets.

7. A motor vehicle comprising an electrical machine for providing drive power, an electrical energy store for storing electrical energy for the electrical drive machine, and the charging apparatus of claim 1 for charging the electrical energy store.

8. A method for detecting a temperature of a plurality of plug connection members of a charging apparatus that includes:
   a plurality of plug connection members to connect the charging apparatus to at least one external electrical energy source,
   a plurality of temperature measuring elements associated respectively with the plug connection members to detect a temperature of the plug connection members, and
   an evaluation unit connected electrically to the temperature measuring elements to evaluate the detected temperature of the temperature measuring elements, the temperature measuring being connectable electrically to the control unit individually by a second connecting line, wherein the method comprises:
   sequentially connecting the temperature measuring elements electrically to the evaluation unit for separately detecting the respective temperature of the plug connection members.

* * * * *